(12) United States Patent
Brookfield et al.

(10) Patent No.: US 7,752,123 B2
(45) Date of Patent: Jul. 6, 2010

(54) ORDER MANAGEMENT SYSTEM AND METHOD FOR ELECTRONIC SECURITIES TRADING

(75) Inventors: Bevan Brookfield, Evanston, IL (US); Stuart Townsend, Chicago, IL (US)

(73) Assignee: Townsend Analytics Ltd., Chicago, IL (US)

( * ) Notice: Subject to any disclaimer, the term of this patent is extended or adjusted under 35 U.S.C. 154(b) by 26 days.

(21) Appl. No.: 11/740,609

(22) Filed: Apr. 26, 2007

(65) Prior Publication Data

US 2008/0015970 A1    Jan. 17, 2008

Related U.S. Application Data (60) Provisional application No. 60/796,083, filed on Apr. 28, 2006.

(51) Int. Cl.
*G06Q 40/00* (2006.01)
(52) U.S. Cl. ........................................................ 705/37
(58) Field of Classification Search .................... 705/37
See application file for complete search history.

(56) References Cited

U.S. PATENT DOCUMENTS

| | | | |
|---|---|---|---|
| 5,757,920 A | 5/1998 | Misra et al. |
| 5,764,768 A | 6/1998 | Spelman et al. |
| 5,815,665 A | 9/1998 | Teper et al. |
| 5,864,827 A | 1/1999 | Wilson |
| 5,872,850 A | 2/1999 | Klein et al. |
| 5,987,432 A | 11/1999 | Zusman et al. |
| 5,999,711 A | 12/1999 | Misra et al. |
| 6,014,643 A | 1/2000 | Minton |
| 6,044,155 A | 3/2000 | Thomlinson et al. |
| 6,278,982 B1 | 8/2001 | Korhammer et al. |
| 6,349,291 B1 | 2/2002 | Varma |
| 6,427,209 B1 | 7/2002 | Brezak, Jr. et al. |
| 6,584,505 B1 | 6/2003 | Howard et al. |
| 6,654,745 B2 | 11/2003 | Feldman |
| 6,766,304 B2 | 7/2004 | Kemp, II et al. |
| 6,772,131 B1 | 8/2004 | Francis et al. |
| 2002/0023040 A1 | 2/2002 | Gilman et al. |
| 2002/0107781 A1 * | 8/2002 | Neyman et al. ............... 705/37 |
| 2002/0128958 A1 | 9/2002 | Slone |
| 2002/0135794 A1 * | 9/2002 | Rodriguez et al. ......... 358/1.15 |
| 2002/0147670 A1 | 10/2002 | Lange |
| 2002/0156718 A1 | 10/2002 | Olsen et al. |
| 2002/0169707 A1 | 11/2002 | Koek et al. |
| 2003/0040955 A1 | 2/2003 | Anaya et al. |
| 2004/0148244 A1 * | 7/2004 | Badeau et al. ................. 705/37 |
| 2004/0148247 A1 | 7/2004 | Miller et al. |
| 2004/0260640 A1 | 12/2004 | Crosthwaite et al. |
| 2005/0005094 A1 | 1/2005 | Jamieson et al. |
| 2005/0049955 A1 | 3/2005 | Kohnhorst et al. |
| 2005/0120121 A1 | 6/2005 | Guo et al. |
| 2005/0125327 A1 | 6/2005 | Fishbain |
| 2005/0131797 A1 | 6/2005 | Ananthanarayanan et al. |

(Continued)

*Primary Examiner*—Jagdish N Patel
*Assistant Examiner*—Kevin Poe
(74) *Attorney, Agent, or Firm*—Morgan Lewis & Bockius LLP (57) ABSTRACT

A system includes a communication module to communicate with at least one client; and a server to process a task identified by the client, the task associated with an account, the server including a plurality of account-centric pipelines, one or more account-centric pipelines each configured to process the task.

23 Claims, 2 Drawing Sheets

U.S. PATENT DOCUMENTS

| | | | |
|---|---|---|---|
| 2005/0166037 A1* | 7/2005 | Barrick | 712/220 |
| 2005/0193093 A1 | 9/2005 | Mathew et al. | |
| 2005/0283427 A1* | 12/2005 | Owens et al. | 705/37 |
| 2006/0117318 A1* | 6/2006 | Rumelhart et al. | 718/104 |
| 2007/0043650 A1* | 2/2007 | Hughes et al. | 705/37 |
| 2007/0250426 A1* | 10/2007 | Demirjian | 705/36 R |

* cited by examiner

ORDER MANAGEMENT SYSTEM AND METHOD FOR ELECTRONIC SECURITIES TRADING

This application claims the benefit of U.S. Provisional Patent Application No. 60/796,083 filed Apr. 28, 2006, which is incorporated herein by reference.

BACKGROUND OF THE INVENTION

The invention relates to a securities trading order management system that is capable of allowing an authorized user to place and execute orders for trades of various types of securities (e.g., stocks, bonds, futures, options, derivatives etc.) in real time. More particularly, the invention is directed to a method of operating such an order management system to incorporate real time financial market data and real time financial market access for trading, while also providing critical pre-trade and post-trade operators to protect the value of a user's investment portfolio.

Before the availability of high speed data send and receive connections, brokers and traders were forced to limit their securities trading activity exclusively to the financial exchange market floor. It was not possible to engage in remote site trading over the internet as available at the time because of slow connection times that would most certainly hinder effective trading. However, with the increasing availability of high speed data communication lines over which it is possible to send and receive data sufficiently in real time, it has become more feasible to implement electronic trading. This has opened up the doors for those in the financial securities trading field to a whole new specialty of participating in the trading of securities in remote exchange markets.

A number of management systems exist that allow for electronic securities trading based on the internet. For example, U.S. Pat. No. 6,014,643 is directed towards an interactive securities trading system that is connected to a communication network of users. The trading system matches a first user that places an offer to sell a certain security with a second user that has requested to buy that particular security. Once the second user has communicated the intent to buy at an agreed upon price, the first user has the option to accept, and if accepted, then funds are automatically withdrawn from the second user's bank account and deposited into the first user's bank account. This invention provides a useful system for matching up buyers and sellers by creating a direct network environment; however, it lacks the capability to run any sort of risk analysis to aid a user's decision to buy or sell a security.

In addition to the pure speed of the data connection available, it is essential for an order management system to have an easy-to-use user interface that will further aid in quick and efficient order transactions. As an example, U.S. Pat. No. 6,766,304 is directed to one type of user interface, a graphical window viewing interface, provided for a user to access an electronic exchange trading environment. While providing an efficient user interface succeeding in its ease of use, this invention still lacks the capability to run risk analysis on a user's trade to determine a grade of risk, and it does not offer any post-trade analysis for suggesting a next possible trade from a user's portfolio.

While the introduction of high speed internet connections has been integral in the new age of electronic trading of securities, it has also resulted in an increased amount of competition between the brokerage and trading firms to take full advantage of the near real-time speeds of these electronic systems and try to put as many orders through at once. The current state of the art is lacking in this aspect for being limited to single order management and not having the capability to handle multiple complex trade orders at once.

The current invention is an order management system able to overcome the shortcomings of the prior art by integrating pre-trade operators to handle compound order management and post-trade risk analysis to update the state of a user's most current investment portfolio.

SUMMARY OF THE INVENTION

In an aspect of the present invention, a near real-time trade server is disclosed having an account-centric pipeline architecture wherein each thread is associated with an account. The account-centric pipeline architecture includes an internal allocator that prevents two threads from processing orders from the same queue at the same time. This restriction eliminates the need for record locking and the delays caused by record contention.

A further aspect of the present invention discloses a compound order type that may be used to create synthetic spreads. The compound order type serves as an aggregation point for all the suborders that make up a compound order. Each suborder may be processed independently of the other suborders and may be routed to different exchanges for execution.

In one aspect of the invention, a method of operating an order management system is disclosed comprising the steps of: validating a user's access rights by utilizing a permissions system for allowing the user to only have access to the financial exchange systems on which he is entitled to trade; initiating a pre-trade operation that is executed before a user's trade command is inputted into the financial exchange server; executing the user's trade command by accessing the financial exchange market of choice; and initiating a post-trade operation that is able to run a risk analysis scan of a user's account based on the user's trade history and current investment portfolio stored in the order management system account.

A further aspect of the invention has the pretrade operation responsible for computing a Credit at Risk (CAR) and a Value at Risk (VAR). These two components are used to determine a risk factor associated with an impending trade decision by a user. The user can then decide whether or not to go through with placing the trade for execution into the financial market exchange based on the risk factors computed.

In a further aspect of the invention, the post-trade operation has the capability to query through the account user's existing portfolio in search of securities holdings that are deemed to potentially change significantly, either increase or decrease, in value in the near future. This allows the user to have added insight into potential future trades that will enhance profit or mitigate loss.

It is yet another aspect of the invention to provide all market data feeds and execution of orders in near real time. By near real time, it is meant close enough to actual real time so that trades can be executed before prices for the securities change significantly, but no so fast as to overwhelm or unduly slow the operation of the computer system on which the order management system is implemented. This can be accomplished by incorporating the order management system into a platform that is connected to a high speed data communication connection so as to be connected to the various financial market exchanges throughout the world.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system includes a communication module to communicate with at least one client; and a server to process a task identified by the client, the task associated with an account, the server including a plurality of account-centric pipelines, one or more account-centric pipelines each configured to process the task.

In another aspect, a method includes the steps of queuing a task to a pipeline queue, the task associated with an account, assigning an executable thread to the task in the pipeline queue and the executable thread to one account-centric pipeline, and processing the task through the account-centric pipeline.

In yet another aspect, a computer program product includes a computer readable medium having stored thereon computer executable instructions, which when executed on a computer, directs the computer to perform a method comprising the steps of queuing a task to a pipeline queue, the task associated with an account, assigning an executable thread to the task in the pipeline queue and the executable thread to one account-centric pipeline, and processing the task through the account-centric pipeline.

It is to be understood that both the foregoing general description and the following detailed description are exemplary and explanatory and are intended to provide further explanation of the invention as claimed.

BRIEF DESCRIPTION OF THE DRAWINGS

The invention will be described by reference to the preferred and alternative embodiments thereof in conjunction with the drawings in which.

DETAILED DESCRIPTION OF THE INVENTION

Figure 1:
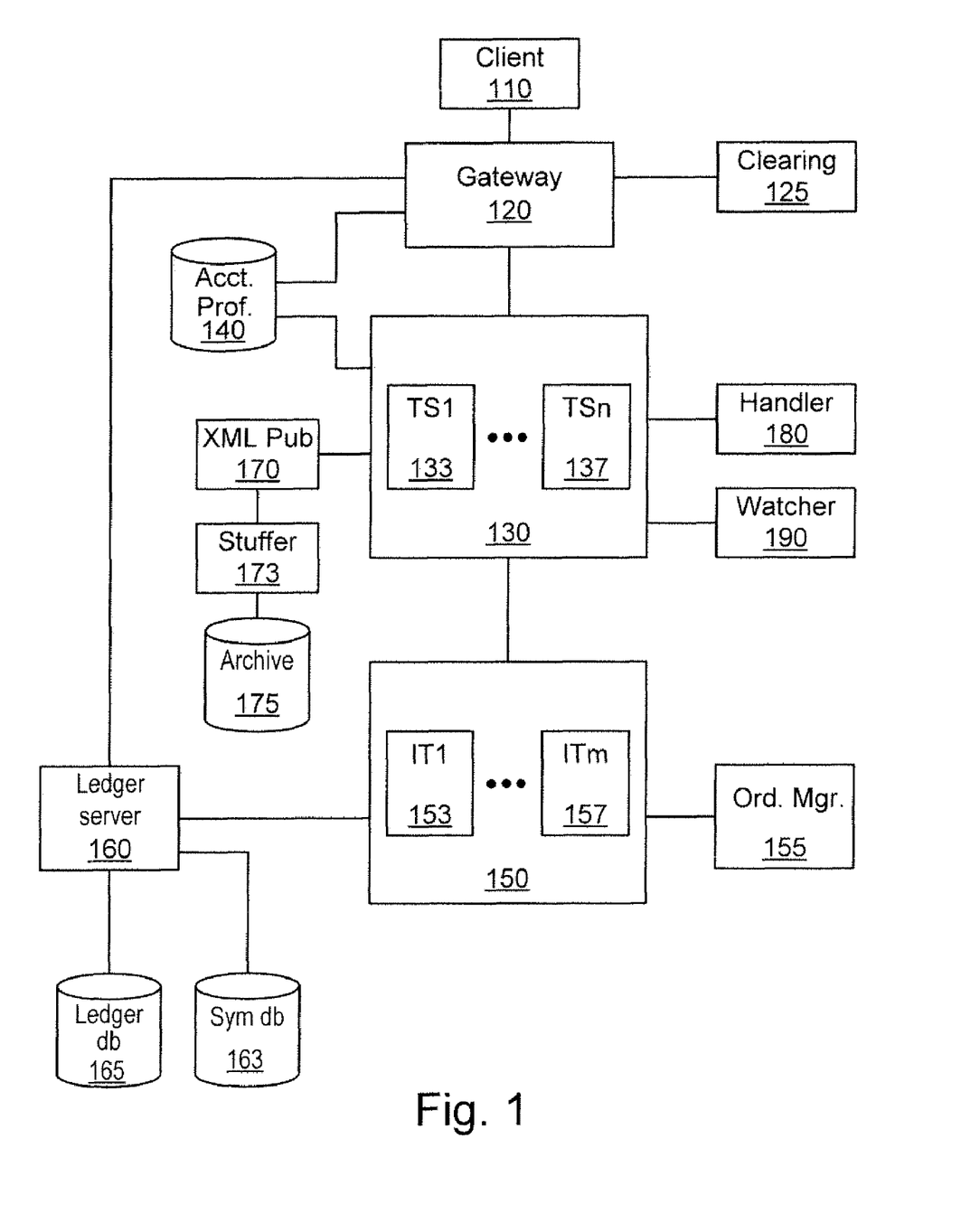
FIG. 1 is a component diagram of an embodiment of the present invention.

FIG. 1 is a component diagram of an embodiment of the present invention. Gateway component 120 translates and routes messages from client component 110 to the correct trade server 130. The client component 110 enables a trader to send trade orders to an order management system (OMS) and receive updates and order confirmations from the OMS. The client component 110 is preferably a software component installed on the client's remote computer. The installed component may be as simple as a browser or may be a customized front-end to the OMS. The client component 110 may be a simple FIX translator that sends FIX messages to the OMS from clients that only require the trade execution features of the OMS.

Copies of messages between client component 110 and the gateway 120 may be sent to a clearing interface 125 for clearing or settlement of the executed trades. The clearing interface 125 may be a FIX reporter that translates messages into the standard FIX protocol. The FIX messages may then be routed to a third-party clearing application that handles the settlement for that client. In some embodiments, an optional clearing application may be connected directly to the gateway 120 and provide settlement for the executed trades.

An account database 140 maintains the account profiles of each account. The account profiles include the rules, permissions, restrictions, and preferences of the account.

A trade server 130 manages the state of each account such as, for example, the positions, balances, and rules for each account. The trade server verifies that each account order has the required balances and satisfies every rule for that account. When the trade server 130 determines that the account order is permitted, the trade server 130 forwards the order to a stateless order handler 180. The handler 180 translates the order into a form readable by the particular destination exchange associated with the order and forwards the translated order to the destination exchange.

A market watcher 190 monitors the market according to instructions from the trade server 130 and relays the requested market information back to the trade server 130. The market watcher 190 enables the trade server 130 to execute trade orders based on market conditions.

An archive database 175 maintains the trade events generated by the trade server 130 that must be kept for historical or legal purposes A trade stuffer 173 provides an interface to the archive database 175 from the trade server 130. Writing to the archive database 175 is usually a slow operation and may cause a bottleneck in the trade server 130 as trade events become backed up in the trade server. In a preferred embodiment, an XML publisher 170 provides a large buffer that receives the trade events from the trade server 130, translates them to XML, and stores them in intermediate storage until the trade stuffer 173 can write the trade event to the archive database 175. The buffer provided by the XML publisher 170 enables the trade server 130 to process trade orders without delays caused by the slower archive database 175.

An Itask module 150 provides redundancy and crash recovery for the trade server 130. The Itask module keeps an in-memory copy of the trade server 130 that prevents loss of account status information if one of the processors in the trade server 130 fails. Keeping an in-memory copy of the account status also enables rapid recovery for the fail-over processor.

An order manager 155 enables a system manager or help desk personnel view the current trade status of an account.

A ledger server 160 manages a ledger database 165 that maintains a history of all trade events and account status from the Itask module 150. The information in the ledger database 165 provides a backup to the Itask module 150 such that account status may be recovered to a failover Itask module if the Itask module 150 fails. A symbol database 163 maintains a master list of all traded securities and includes the symbol aliases for each exchange.

In a preferred embodiment, the trade server 130 comprises one or more processors, with each processor running one or more threads. Referring to FIG. 1 trade server 130 includes processors TS1 133 through TSn 137, where n is the number of processors in the trade server 130. Each processor executes the same trade server software component but run independently of the other processors. An advantage of the configuration shown in FIG. 1 is that the trade server 130 is easily scalable. As more accounts become active, additional processors may be added such that each account does not see any appreciable delays caused by processing of the other accounts.

Similarly, the Itask module 150 comprises one or more processors that maintain an in-memory copy of the trade server 130 processors. The number of processors in the Itask module 150 does not have be the same as the number of processors in the trade server 130. For example, in FIG. 1 the trade server 130 has n processors and the Itask module 150 has m processors.

Near real time processing of orders may be achieved through the use of account-centric pipelines in the trade server 130. In typical prior art systems, up to 70% of the CPU cycles are wasted while the CPU waits for data from external sources such as a market feed or an external database. Thread capable CPUs allow for order processing in smaller increments that tend to reduce the wait time for external data. In real time systems, however, a significant source of delay is caused by contention of a shared resource such as when two or more threads attempt to access the same record in a database or same container/structure in memory and all but one must be blocked in order to serialize the access. A novel aspect of the present invention removes the possibility of a contention situation by creating account-centric pipelines. In an account-centric pipeline, each executable thread is associated with an account and a check is made such that no two threads are processing the same account at the same time. This enables the removal of all lockings and lock checking from trade processing, thereby freeing up extra CPU cycles for actual trade processing.

Figure 2:
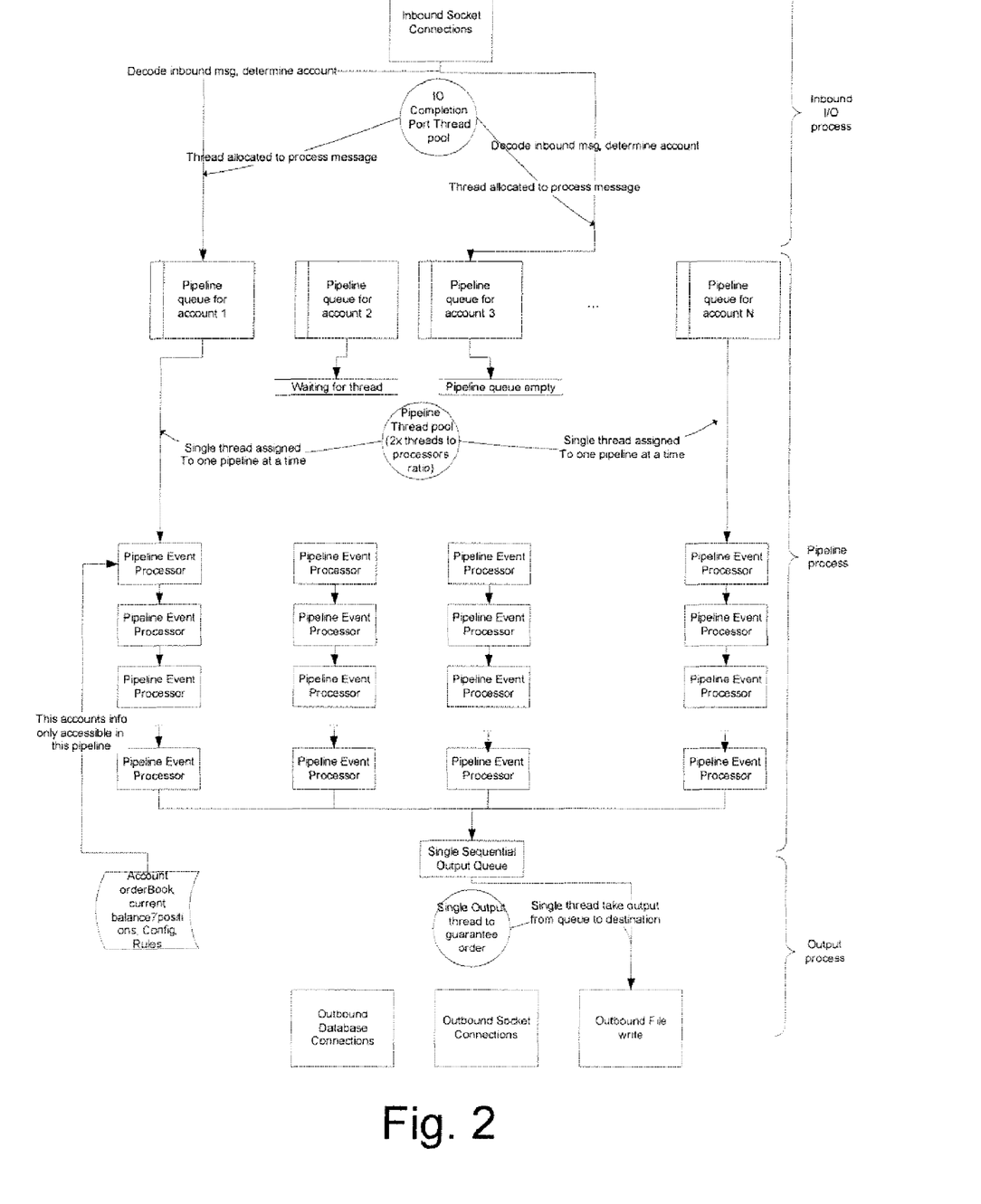
FIG. 2 is a diagram of the pipeline/threading architecture used by trade server 130 in a preferred embodiment of the present invention.

FIG. 2 is a diagram of the pipeline/threading architecture used by trade server 130 in a preferred embodiment of the present invention. In FIG. 2, an inbound I/O process takes an inbound socket message. When signaled by the operating system that I/O is complete and the message has been fully received, the message is decoded into a StaticOrder container and the account associated with the message is determined. In a preferred embodiment, the IO completion port has twice as many threads as the host machine has processors.

An internal thread pool serves the pipeline queues. The thread pool allocates threads to process static order messages waiting in the pipeline thread queue. The internal allocator has interlocks to prevent two threads from processing statric orders from the same queue at the same time, even if no other queues are waiting.

Each pipeline thread processes the order message through a series of logic steps contained in Event processors. The order processing is linear and the same for all messages. The pipeline thread has exclusive access to all account state and configuration information for that account.

After the static order has completed processing through all event processors, output messages are created for the current state of the static order and any changes to parent orders, account balances, and positions. These messages are placed in a single output queue.

The output queue is served by a single thread to ensure strict ordering. A message is extracted from the queue and sent to other components such as the gateway 120, Itask 150, database 175, and handler 180.

The account centric pipeline processing of an order/event is performed by a number of steps of logic which are performed serially in defined sequence. The collection of logic units all implement a standard interface, and they may be separately compiled from the overall trade server parent. The items in, and order of the pipeline may be defined at runtime. The same pipeline is used for all orders/events regardless of type. The pipeline is preferably processed in sequence, without jumping, aborting or iteration.

Each event processor implements a standard base interface. The result of each event processor indicates whether to continue or suspend if the order is suspended then the suspended flag is set on it, but the order continues through the pipeline. Other event processors may optionally process it although most will ignore it. The same order may later reflow through the pipeline again when the cause of the suspension, such as an asynchronous price/time event, has been removed.

If the order fails a process event, a failure flag associated with that event is set on the order but the pipeline processing of the order continues. Subsequent event processors may do nothing with an order that already failed but others may still process it. A failed order causes a new clerk reject event to be created in the final spewPrep event handler, to be sent with the event, for example if an order is received but fails in the margin check stage, then that order is marked as failed (and set to STATE_DELETED), but processing continues, albeit with most event processors ignoring a failed event. In the spewPrep stage, a clerk reject is created to indicate the failure of the order.

Account information may be required by some event processors. In order to separate event processors into separately compiled units (dlls) an abstracted interface to account and underlying position data is implemented in a dll itself.

Some event processors require the ability to add new events to the hopper, either synchronously (e.g clerk rejecting an invalid order), or asynchronously (stop order triggering), hence the presence of a hopper ref in the ITradesrvEnvironment interface.

IAccount and ITradesrvEnvironment are abstract interfaces to the account and to the non pipeline TS3 environment (hopper and spew objects). Virtual methods and abstract base classes or templates may be used to implement these objects depending on performance requirements.

Event processors can assume unfettered access to account, the event being processed, and any parent order or other orders owned by the account. Locking on other datastructures are kept to a minimum for efficiency. The event processor proceeds to process the event completely without blocking, but if this is not possible, suspends processing (e.g., returning evtSuspended) and utilizes an internal thread or event callback thread to process the event after the wait, then resumes processing by posting an event to the hopper.

When an order is suspended, the suspending event processor keeps a reference to it, so that at some later time it may resume it. If the event that resumes the order is asynchronous to the pipeline (e.g., either a price feed or timer), then to resume the order a special event ACTION_RESUME_SUSPENDED_ORDER is placed in the hopper. This event includes the order ID and account number of the event to be resumed (i.e., this event is the parent of the resume event). This event enters the pipeline and is processed by each event processor in the normal order. On reaching the event processor which suspended the event parent, found by matching the suspending event processor name stored in that event parent, the suspended order can replace the resume event, and thus resume its flow down the rest of the event processor pipeline.

A ConditionalOrder event processor handles stop, stop limit, trailing stop, and more general price conditional orders. Stop, stop limits and trailing stops all operate using an indexed store of references to orders, a 'watch list' of required symbols and a connection to a price feed. When a stop order is processed, it is stored in the index based on symbol then stop price. The symbol is added to the reference counted watch list (if not already present). An insert triggers an advise (not request) to the price feed (TA_SRV recombiner). The stop order is not further processed in the pipeline at this time, the EvtResult of the eventProcessor call is evtSuspend. Callbacks from the price feed are handled using a callback thread. The index of the symbol is found and the index traversed starting at current price to find any triggered stops. A triggered stop order results in a ORDER_TRIGGERED event (e.g., ACTION_RESUME_SUSPENDED_ORDER event) being placed in the hopper, containing the triggered order's id as a reference. Processing of this message in the stop event processor removes that order from indices and allows it to continue through the pipeline. In other words, the original order takes the place of the ORDER_TRIGGERED event (e.g., ACTION_RESUME_SUSPENDED_ORDER event) in further processing. A triggered stop order also reduces the ref count of a symbol in the watch list, and if zero, the symbol is removed.

A TimedOrder event processor handles timed orders and operate the same way as stop orders, except the watch list is simply an ordered queue of events, and a timer replaces a price feed. The timer is primed to trigger for the time of the first event in the queue, and on triggering the queue is traversed to send ORDER_TRIGGERED (e.g., ACTION_RESUME_SUSPENDED_ORDER event) events for the first and any subsequent orders that are triggered, these orders are then removed from the queue. The timer is then set to trigger for the first event in the queue again. When new timed orders are received, an insert into first place in the watch list queue requires resetting the timer. Orders that are both good from and good until will have two entries in the queue, for those two times.

A ChronosEvent event processor preprocess orders and populates the static order internal effectiveGoodFrom and effectiveGoodTo time fields, based on price type, user entries for expiration type (e.g., Day), user entered firm times maintained under account, and route rules, route session times maintained in a routes structure.

In order for pre-trade margining checks for accounts from non-institutional traders to be possible, market type orders will require current prevailing price information. Depending on the client software used to connect to the gateway 120, this information (e.g., last price, bid, ask) may be sent with the order but cannot be guaranteed to always be part of an order. While every effort should be made to avoid requiring such server lookups by taking into account price data already in the order, and account types that do not require pre-margining, for some market type orders the price must be retrieved. A price retrieval event processor operates the same way as stop order event processor, except that when price data is returned the order is always triggered rather than conditionally triggered.

Some classes of order type may also require other security information such as, for example, underlyer for options. This event processor may also insert such data based on requirements of the security type, exchange and route of the order, for example.

A handler assigner event processor uses a collection of connected handlers and a collection of route permission data. A route permission object can exist for a route that is not connected, as all permissions are preloaded on startup, but a connection cannot be accepted without a corresponding route permission. The handler assigner event processor processes orders by preassigning to a specific handler, or rejects the order as unroutable. Where more than one handler for a route exists, basic round-robining or another load balancing strategy is used. The preassignment is based on a reroute$_{13}$exit_vehicle field, which reflects any necessary internal rerouting by the RoutableOrderReroute event processor. Orders are preassigned by setting a claimed_by$_{13}$ clerk field to a user domain value of the specific handler. Events on orders such as cancel, change, copy the preassignment of the parent order, and are ignored by this module.

A RoutableOrder Reroute event processor uses an existing OrdRoute memory cache of rerouting rules to determine a possible new exit vehicle for the order based on a number of input arguments. The result is put in reroute_exit_vehicle field of the order.

A Blotter Order event processor handles blotter orders, which have in common a relationship between multiple orders of a type. Examples of blotter orders include stage orders, OCO (order-cancel-orders), and OSO (order-send-orders). For example, in a staged order, the relationship is between parent and child. A staged order processor will accept staged orders if the account is given permission to enter them, and will verify any "ordinary" order for a ticket_id with parent type of staged. Identified child orders of a staged order are validated for matching symbol, side, acceptable price (if parent is limit), etc. The total of all child orders volume (filled or live) cannot exceed the volume of the parent staged order, in order to achieve volume control.

A Handler Reconnect event processor processes a special event type, ROUTE_RECONNECT. On reconnect of a handler, the trade server must send a cancel for all pending orders on that route—this will cancel any orders that reached the remote exchange but were not reported as accepted due to the handler outage. Cancel rejects for orders that never reached the remote exchange due to the handler outage will convert the state of those orders from pending to dead. The reconnect of a handler results in a ROUTE_RECONNECT for each account, which contains only the exit vehicle and claimed_by_clerk fields which identify the specific handler. This event processor preferably searches the account order book for any pending orders for the handler detailed in the event, then creates cancels for those orders and puts them into the hopper.

A SystemCommand event processor allows account-centric administration commands, such as reload account from ledger server, reload account perms, margin rules, etc.

A StaticValidation event processor performs static sanity checking on an order/event based on its type and state. While this event processor conforms to the eventProcessor interface and therefore has account information, it does not use it. Validation is done using static rules examining the order such as, for example, is an order_id present, does a USER_SUBMIT_ORDER have a price type, etc.

An AccountEventAllowed event processor uses the account permissions ("perms") to determine if the event is allowed.

An AccountCheckMargin event processor operates on a user_submit_order and user_submit_change. If the account does not require margin checking (institutional), the event processor does nothing. If the order is sourced from a client front-end application, the margin checking is optional based on a global configuration setting. If margin checking is required, the order is applied to the margin rules of the account to get a margin requirement. This is checked against the current available excess equity of the account minus the margin requirements of all previously accepted orders for the account that are pending or live, using a most pessimistic approach. Pending orders that take margin are considered, but not those that release margin. For the same reason, stop and timed orders are margin checked when entered, not when triggered. If there is sufficient margin, the order is accepted and the margin required written into the order.

Market type orders require a bid/ask information in order to precheck margin. The information is supplied by the client or in the PriceSecurityInfoRequired event processor.

Changes are considered the same way as orders, except the volume supplied to the margin calculator is reduced by any partial fills already processed on the order. The original order being changed is not considered when summing the margin requirements of all previously accepted orders for the account that are pending or live. If there is sufficient margin to allow the change, the original order marginRequired field is changed to the newly calculated value margin requirement of the change.

The offsetting effect of sets of orders that form legs of a spread, and should result in a lower overall margin requirement, may be considered when checking available margin.

An AccountAdjustMargin event processor operates on exchange_trade and exchange_bust. The event processor does nothing if the account requires no margin checking (institutional). If margin checking is required, the fill (or bust) is applied to the margin rules of the account to get a margin requirement (or giveback). This then reduces (or increases) the available excess equity of the account.

For partial fills, the marginRequired field of the original order is reduced by the amount of margin just taken off the account excess equity, so that the margin requirement of the outstanding quantity in the order is fair. For total fills, the marginRequired field of the original order is zeroed.

An AccountAddPosition event processor operates only on exchange_trade and exchange_bust, and modifies the account's position collection to reflect the trade or bust. The change to position and current balance (Deposit) is sent to ITask3 and gateways by creating a TAL block which is immediately put in a spew queue.

An UpdateOrderState event processor takes the current event and updates the original order's state based on static rules, such as when an exchange kill event changes the order state to deleted. Exchange Trade, Exchange Kill, Exchange Bust, Exchange Accept (of a change), Clerk Accept, and Clerk Reject may all impact an original order's state. At this stage, certain fields required for fix translation are copied from the order to the event if not already present in the event. These include average price, volume traded, etc.

A FeesAndCommissions event processor operates only on exchange_trade and exchange_bust. It will calculate the fees, commissions, and markups that affect the account excess equity. If there is a markup, T_PRICE_MARKUP is set with the markup amount, while PRICE is adjusted to be the gross amount including markup. The client may not be shown the markup, but other systems may require it, so the net price can be calculated.

A Suitability event processor implements suitability checking on user_submit_orders/changes based on the rules for the route, and totals held in the account structure.

A PositionRequest event processor processes a dummy order with a new type, USER_POSITION_REQUEST. The request includes TQL in the reason field. The accounts positions, balances are generated in a (possibly multi-row) response block, which is immediately put in spew to be sent to only the requester gateway. The response block is formatted into a standard format CMessage.

The gateway is responsible for receiving a position request from the client component and turning that into a USER_POSITION_REQUEST event that is sent to the trade server just as any other order/event such that the trade server does not have to handle requests.

Other event processors ignore USER_POSITION_REQUESTs, and they are not forwarded to ITask or XML writer.

A SpewPrep event processor takes an input event and produces block output, which can be sent on the conversations connected to trade server by the spew process. This event processor is necessarily the last one in the pipeline. If the event has not failed, it takes the processed order and its associated original order (if there is one) and marshals them into a block. This block is put inside an OutputMessage (previously CMessage), and the exit vehicle and handler machine of OutputMessage are set from the events exit vehicle and handler machine. The OutputMessage is then added to the spew queue. If the input event processed is designated as failed by a previous event processor, a clerk reject event is created in the account order book using the reason text in the input event, and referring to the order id of the input event. This new event is marshaled to a block along with the input event, and inserted into a OutputMessage. The OutputMessage is then added to the spew queue.

In addition to known order types, embodiments of the present invention are able to process compound orders. Compound orders may be used to create and execute a synthetic spread that is not implemented as a single symbol by an exchange. The spread may be a two-legged spread or more complex multi-legged spreads such as a Butterfly. In addition to creating and executing synthetic spreads, a compound order may be used to execute Order-Cancels-Order, Order-Send-Order, Covered Calls, and Baskets. A compound order type serves as an aggregation point for all the suborders that make up the compound order. Each suborder is characterized by a linkage type and cancellation type to the compound order. The linkage type defines the type of compound order, such as for example, a synthetic spread. The cancellation type characterizes how the other suborders in the compound order is affected by the cancellation of the suborder. In an All-or-None type, if any suborder of the compound order is cancelled or killed, the trade server will attempt to cancel all the other suborders of the compound order. In an Atomic type, the cancellation or killing of a suborder does not affect the other suborders of the compound order. In an Autonomous State, the cancellation or killing of a suborder does not affect the other suborders of the compound order and the compound order will remain alive even if all the suborders are cancelled. An Autonomous State compound order allows for the addition of new suborders while alive and can only be cancelled by an explicit cancellation of the compound order. Each suborder may be processed independently of the other suborders and routed to a different exchange for execution.

In a preferred embodiment of the invention, the order management system is available for a user to interact through a graphical interface, implemented and displayed, for example, on a personal desktop computer (PC) or laptop computer. Other embodiments, however, may include alternate means for providing the graphical interface to a user, such as a stand-alone workstation or even a hand held device, for example.

Further, in the preferred embodiment of this invention, the order management system is accessed by a user only after successfully passing a permissions system. The permissions system ensures that the user is able to access only those financial exchange markets on which he or she is authorized to trade. This feature is needed to ensure the integrity of the financial exchange markets available to be traded in by this invention, because it is possible for a user, such as a broker, to be authorized to secure trades in one financial exchange, but not in another.

The system of the invention may be used to trade on traditional, electronic, and alternative exchanges. For reference, Table 1 displays a representative list of North American and foreign exchanges supported by the invention. It should be understood that embodiments of the present invention are not limited by the list of exchanges shown in Table 1 and support of other exchanges are within the scope of the present invention.

TABLE 1

| | |
|---|---|
| AMEX | ArcaEx |
| CBOT | CME |
| DJW | Eurex |
| MX | NASDAQ |
| Philadelphia BOT | Pink Sheets ® |
| NYBOT | NYMEX/COMEX |
| NYSE | OneChicage |
| OPRA | TSA & TSX Venture Exchange |
| Bolsa Madrid | Borsa Italiana |
| Copenhagen Stock Exchange | Duetsche Börse |
| Euronext | MEFF |
| HEX | FTSE |
| London Stock Exchange | Oslo Bors |
| SWX Swiss Exchange/virt-x | Stockholmbörsen |
| Stuttgart Stock Exchange | Forex |

Because trading securities in foreign electronic exchange markets is supported by the order management system, a user may set a default home currency to correlate with a home market. The system includes a currency converter to perform a conversion of all foreign currency to match up with the default currency. Alternately, the order management system may be configured to margin all securities that are traded in a foreign exchange or foreign currency After having successfully permissioned into the desired electronic exchange, a user may configure and personalize the graphical user interface. The graphical user interface displays, for example, a number of windows showcasing the user defined fields onto the screen. Data fields for the graphical interface are provided by being connected through a streaming data provider. Streaming data from the financial exchanges are updated into the data fields of the graphical interface periodically, e.g., every minute, throughout the day. Some examples of data fields that can be displayed on the graphical interface include viewing windows displaying: ticker updates, current quotes for the securities being traded, financial market news updates from desired news sources, an integrated web browser, financial research tools, and alarm screens alerting the user of market highs and lows.

Further, the graphical interface of the invention is flexible by allowing a user to perform functions such as the following. The user may create new windows with one mouse click by dragging a symbol from the Symbol Guide or from an existing window, dropping it onto a Toolbar button, and instantly creating the new window for that instrument. The user may drag-and-drop to add instruments to or move instruments among tickers, charts, and other available plug-in functions/instruments. The study or screen to which the user adds a symbol will update immediately with the new instrument's information. The user may use Favorites to bypass the setup process for the windows used the most. The user may simply save a study as a Favorite and then recreate it on another page with a single click, including the user's preferred colors, layout, technical analysis, etc. The user may move quickly among pages with user-defined shortcut keys called HotKeys. The user may alter the content of various windows simultaneously. With window-to-window linking, when the user changes a symbol in one window, the symbol choices of all linked windows on the same page will change accordingly. The user may create unlimited customized pages and control all fonts and colors.

The user may update and modify the graphical interface at any time, before or after the execution of securities trading. The graphical user interface modification process is preferably performed prior to the execution of trades.

When the user is finished setting up the graphical interface to display the desired fields, the order management system is ready to accept the user's input securities trade through the graphical user interface. The present invention is unique in that it is able to handle compound securities trade orders instead of managing only a single order at a time as was the prevalent practice. This added compound order management capability allows the system to handle an expanded range of types of complex order schemes. In particular, with the added capability of executing compound orders, the order management system is able to process complex order schemes such as: Order Cancel Order (OCO), Order Send Order (OSO), All or None orders, and Basket orders.

An Order Cancel Order is a group of orders that are submitted together, and when one of the orders from the group is executed, the rest of the orders are canceled. This type of order has the greatest margin requirement of the non-linked individual compound orders.

An Order Send Order is a group of orders that are submitted together, and one order is said to go "live." The "live" order is then executed, and is set to trigger another order. Then another of the remaining orders from the group is tagged to be "live" and when that one is executed, it triggers another of the remaining orders, and so forth until all the specified orders have been executed. This type of order has the greatest margin requirement for all the linked, sequence compound orders.

An All or None order is a group of orders which is submitted for execution, they could follow the OCO or OSO strategy, or be a spread or basket order. However, the All or None attribute means that if one order is cancelled or becomes killed, all the others will be cancelled automatically. The margin requirement for this type of order is the overall margin requirement for the group.

A Basket Order is a group of independent orders which are submitted together, and then a margin is computed as if they were submitted one by one. However, if the user's account buying power is insufficient, the entire basket is rejected. Preferably, partial submission of a Basket Order is not allowed.

The order management system is capable of handling all other types of complex and/or compound securities trade orders as known in the art.

Before the user defined trade is executed into the financial exchange systems, a risk manager, as part of the order management system, is implemented to scan the user's account portfolio and notify the user of potential risks. The risk is determined by the risk manager by the computation of two components: Credit at Risk (CaR) and Value at Risk (VaR).

CaR is a sufficiently real-time reporting tool that monitors a user's (e.g., a broker's) account credit risk by comparing the relative situation between an account's equity level and its debt level. As a function, the Credit at Risk is computed by the order management system as the Net Liquidation value of user's account less the margin requirements.

The CaR allows the risk manager to determine a credit buying power for the user. Once a credit buying power is determined, the value is compared to the user's preset credit policy. The risk manager can then warn the user when his or her credit policy will be violated by the user's potential trade decision. The risk manager may provide suggestions for alleviating any violations of a user's credit policy, such as potential margin calls and/or forced liquidation of positions in the user's portfolio.

VaR is the amount of money a financial portfolio may lose over a period of time with a certain level of confidence. For example, a VaR as represented by ($100, 1 day, 95%) indicates a portfolio having a 95% probability of not losing more than $100 during a one-day period. In the U.S. financial market, the 1-day 95% standard reporting form is known to be the dominant standard for reporting VaR. In Europe, however, the standard is a much more conservative 10-day 99% reporting standard. Because the current order management system is intended for global markets, including both U.S. and European markets, it can compute both the 1-day 95% and the 10-day 99% standard forms as well as any other desired form.

In computing the VaR, the primary historical data of interest is the historical volatility information for each security in a user's portfolio. There are many known industry practices for estimating volatility, the most popular of which are Simple Moving Average, Exponentially Weighted Moving Average, and the more general GARCH method. In a preferred embodiment, the order management system of the present invention uses the Parkinson's method of High-Low range volatility to estimate volatility. It is believed that Parkinson's method provides a better understanding of a financial market exchange's dynamics throughout the trading day than the other methods and is much more sensitive to variations of dispersion. An advantage of using Parkinson Numbers to estimate volatility is that less data is needed to estimate volatility at a given accuracy compared to the amount of data needed using regression-based traditional methods. The ability to estimate volatility at a given accuracy quickly may be important during the trading day.

The Parkinson's High-Low range volatility estimates the volatility of returns for a random walk using the high and low in any particular period. In general, the Parkinson's High-Low volatility number is computed as follows;

$$V = \sqrt{\frac{\frac{1}{4\ln(2)}\sum_{i=1}^{n}\left(\ln\frac{H_t}{L_t}\right)^2}{n}}$$

where $H_t$ is the period high and $L_t$ is the period low, and n represents the number of times the volatility has been computed in a given amount of time.

In the context of trading securities on an exchange, V is an estimate of standard deviation of the rate of return on a particular security. The rate of return, R, is a continuously compound rate for the period defined as follows;

$$R = \ln\left(\frac{P_1}{P_0}\right)$$

where $P_1$ is the closing price in period 1 and $P_0$ is the closing price for the previous period.

The risk manager of the order management system standardizes all rates of returns to a continuously daily percentage. Since volatility is a measure of daily rate of return based on daily highs and lows during the trading day, this number can only be estimated. As an added measure to provide the best estimated value possible, the risk manager will only start its volatility estimates a predefined time, e.g., 1 hour, after the trading day begins, which will aid in minimizing the impact of random factors in the market. The intraday volatility estimation using the Parkinson's method is as follows;

$$V_i = \sqrt{\frac{T_D}{T_0}} \frac{1}{2\sqrt{\ln 2}} \ln\left(\frac{H}{L}\right)$$

where H and L are the high and low, respectively, from the start of the trading day to the current time, and $T_D$ and $T_0$ are, respectively, the time period of the trading day and the time period since the security started its trading for the day. This estimation assumes that the assets prices are log-normally distributed and serial independent.

The intraday volatility estimate discussed above captures the volatility during the trading hours, yet contains significant abnormal short-term volatilities, such as those associated with information dispersion. To address this problem, the order management system of the present invention has access to memory storage means for storing approximately ten to fifteen days' worth of Parkinson's volatility estimates in history. The squared average for the past trading days' intraday numbers is the final volatility number used for calculating a VaR number, as follows.

$$V = \sqrt{\frac{\sum_{i=1}^{n} V_i^2}{n}}$$

In general, the calculations involved for deriving VaR value are computationally intensive, and much more so when derivatives are involved. There are several approaches known in the industry for making the process manageable when dealing with derivative trading methods. One approach is to use delta-gamma estimation to compute an option theoretical value. The drawback with this approach is that the method can only deal with situations when underlier (i.e. a security or commodity which is subject to delivery upon exercise of an option contract or convertible security; exceptions include index options and futures, which cannot be delivered and are therefore settled in cash) movement is relatively small, and thus results in undervaluing the risk on derivatives on volatile securities. Other methods, such as SPAN and TIMS, use a full valuation model, which allows for more accurate risk evaluations but consumes the most system resources. In an effort to limit the time burden due to the increased amount of computations, SPAN and TIMS systems conduct most of the complex computations on the server side in overnight batches and store the resulting theoretical data in risk arrays. In this way, a risk manager program need only fetch the data from the risk arrays and compute simple arithmetic when creating risk reports, which may significantly reduce the processing time.

The preferred embodiment of the order management system of the present invention goes a step further in improving upon the SPAN and TIMS methods by estimating an intraday volatility and conducting risk analysis every two minutes, which is made possible by the simplicity of the Parkinson's method. Updating the risk analysis to every two minutes allows the risk manager to utilize the most up to date market data to provide the most comprehensive risk alerts possible.

Table 2 corresponds to a risk array created by the risk manager when determining theoretical values for linear securities models such as stocks, bonds, and futures. The risk array as shown in Table 2 stores price indices relative to the current trading price in a 19 element array. The middle position is defaulted as 1, representing the price itself, and other positions are theoretical prices as a ratio to the current price based on different scenarios.

TABLE 2

| Position | Value = $e^{z\delta}$ | Volatility ($\delta$) | Z | Probability |
|---|---|---|---|---|
| −9 | 0.832 | 2.5% | −7.36 | 10 day 1% |
| −8 | 0.878 | 2.5% | −5.22 | 10 day 5% |
| −7 | 0.916 | 2.5% | −3.49 | |
| −6 | 0.943 | 2.5% | −2.33 | 1 day 1% |
| −5 | 0.960 | 2.5% | −1.65 | 1 day 5% |
| −4 | 0.974 | 2.5% | −1.05 | |
| −3 | 0.984 | 2.5% | −0.65 | |
| −2 | 0.990 | 2.5% | −0.40 | |
| −1 | 0.994 | 2.5% | −0.25 | |
| 0 | 1.000 | 2.5% | 0.0 | |
| 1 | 1.006 | 2.5% | 0.25 | |
| 2 | 1.010 | 2.5% | 0.40 | |
| 3 | 1.016 | 2.5% | 0.65 | |
| 4 | 1.027 | 2.5% | 1.05 | |
| 5 | 1.042 | 2.5% | 1.65 | 1 day 95% |
| 6 | 1.060 | 2.5% | 2.33 | 1 day 99% |
| 7 | 1.091 | 2.5% | 3.49 | |
| 8 | 1.139 | 2.5% | 5.22 | 10 day 95% |
| 9 | 1.202 | 2.5% | 7.36 | 10 day 99% |

In the risk array of Table 2, it is assumed that the stock has a daily volatility of 2.5% and Z is the standard normal random variable. At position −5, for instance, the theoretical value of the stock is 0.96 times the current price. Since, Z=−1.65 at this point, there is a N(Z<−1.65)=5% chance that the stock value will be below this number, where N(x) is the standard normal cumulative distribution. For a one-day forecast, positions −6 to 6 are sufficient. However, when the forecast is expanded to 10 days, the $\sqrt{T}$ rule must be applied (i.e. $\delta_{10}=\sqrt{T}\delta$, where T=10). Since Value=$e^{z\delta}$, it is equivalent to apply $\sqrt{T}$ rule to Z. Thus, for a 10 day forecast, positions −9, −8, 8, and 9 are used.

So far, an explanation for determining the VaR for linear trading models such as stocks, bonds, and futures has been discussed. However, for non-linear models such as derivatives, more complex computation tools are usually needed. The order management system of the present invention handles derivatives by having the pre-trade risk manager use a risk free interest rate and compute an underlier volatility to aid in theoretical computations. In some embodiments, the risk manager uses a 5% risk free interest rate regardless of the holding period to simplify the process, and a Black-Scholes model is used to estimate the underlier volatility.

Table 3 displays a risk array corresponding to a derivatives security. The format for the risk array is similar to that of the linear models of Table 2. The differences are that the volatility and Z values are representative for the underliers instead of for the derivatives themselves, and the values are based upon a more complex, non-linear, Black-Scholes model in place of the simpler Parkinson's model.

TABLE 3

| Position | Value = $e^{z\delta}$ | Volatility ($\delta$) | Z | Probability |
|---|---|---|---|---|
| −9 | 0.113 | 1.24% | −7.36 | 10 day 1% |
| −8 | 0.239 | 1.24% | −5.22 | 10 day 5% |
| −7 | 0.407 | 1.24% | −3.49 | |
| −6 | 0.562 | 1.24% | −2.33 | 1 day 1% |
| −5 | 0.671 | 1.24% | −1.65 | 1 day 5% |
| −4 | 0.778 | 1.24% | −1.05 | |
| −3 | 0.856 | 1.24% | −0.65 | |
| −2 | 0.907 | 1.24% | −0.40 | |
| −1 | 0.939 | 1.24% | −0.25 | |
| 0 | 1.000 | 1.24% | 0.00 | |

TABLE 3-continued

| Position | Value = $e^{z\delta}$ | Volatility ($\delta$) | Z | Probability |
|---|---|---|---|---|
| 1 | 1.050 | 1.24% | 0.25 | |
| 2 | 1.085 | 1.24% | 0.40 | |
| 3 | 1.144 | 1.24% | 0.65 | |
| 4 | 1.244 | 1.24% | 1.05 | |
| 5 | 1.403 | 1.24% | 1.65 | 1 day 95% |
| 6 | 1.596 | 1.24% | 2.33 | 1 day 99% |
| 7 | 1.959 | 1.24% | 3.49 | |
| 8 | 2.569 | 1.24% | 5.22 | 10 day 95% |
| 9 | 3.419 | 1.24% | 7.36 | 10 day 99% |

The Black-Scholes model is used as follows, where P=Option Price is determined using a function of a Black-Scholes in terms of $P_u$=Underlier Price, $R_f$=Risk Free Interest Rate, T=Time to Expiration, and V=Underlier Volatility:

$P$=Black-Scholes$(P_u, R_f, T, V)$

The system of the present invention uses current option price to solve for implied volatility ($V_0$) using the Newton-Raphson estimation. A risk array is computed for the option, where i=−9, −8, . . . , 0, . . . , 8, 9, and $R_{ui}$ is the risk array for the underlier:

$$R_i = \frac{BS(P_u, R_{ui}, R_f, T, V)}{P_u}$$

The simulated price index points carry the same probability as those of its underliers. This allows the system to easily construct the market value risk arrays for a group of positions with the same underlier.

The risk manager computes and relays other values to the user as an aid in placing financially sound orders. For example, the following variables may be computed in respect to options type trades. They can, however, apply to all types of securities trading. Delta is the change of option price per unit value change of the underlier and is the first derivative of the Black-Scholes formula. Gamma is the change of Delta per unit value change of the underlier and is the second derivative of the Black-Scholes formula. Vega is the change of option price per percentage change of its underlier's annualized volatility. Theta is the change of option price per day reduction in time-to-expiration. Lambda is the percentage change of option price per percent change in underlier value.

For each position in an account portfolio a market value risk array is computed as follows, where $R_i$ is the risk array for the security:

$mv_i$=price*volume*$R_i$

Then the portfolio is divided into underlier groups (i.e., groups of positions that have the same underlier). A market value risk array is then aggregated as follows:

$UMV_i = \Sigma mv_i$

Since all positions in an underlier group have the same underlier, their market value movements are correlated. Since each position of the risk array represents one possible scenario of underlier movement, the underlier group market value risk array contains the possible market value of the group for each scenario. The Z value and the cumulative probability of each scenario is the same as the risk array of the underlier Therefore, the 18 scenarios as presented in Tables 2 and 3 allow for the estimation of the Delta and Lambda variables.

The risk manager can recognize the potential financial consequences to a user's portfolio based on the user's trade decisions and offer a potential remedy. Examples of the types of risks, their measures and appropriate remedies are summarized below in Table 4.

TABLE 4

| Type of Risk | Measure | Remedy |
| --- | --- | --- |
| Volatility | Volatility: standard deviation of annualized continuously compound underlier price change. | Hedge with derivatives |
| Sensitivity | Delta: market value change per $1 underlier price change Lambda: percentage market value change per 1% underlier price change | Hedge with option spreads |
| Concentration | Market Value as a percentage of the portfolio | Diversification |
| Overall | VaR | All of above |

There is no perfect way to aggregate VaR values for a portfolio, especially when the portfolio contains multiple types of assets and derivatives. In order to estimate an aggregate VaR, the risk manager makes simplifying assumptions shown in Table 5 below.

TABLE 5

| Assumption | Implication | Remedy |
| --- | --- | --- |
| Moderately diversified | Stocks values are log normally distributed, while derivatives are non-linearly distributed. The value of aggregated portfolio, if fairly diversified, should be normally distributed. | If portfolio is not diversified or its non delta-normal component weights heavily, examining key underlier groups is required. |
| Average Correlation | Among different asset classes, zero correlation is assumed. Within the same asset class, correlation coefficient of 0.5 is used. Assets with same underliers and futures with same root symbol are considered highly/perfectly correlated. | Same as above. |

The order management system uses underlier group market value risk arrays to estimate standard deviations by applying the following formula, where P(x) is the probability of value x and u is the arithmetic average:

$$\delta = \sqrt{\sum P(x_i)(x_i - u)^2} = \sqrt{\sum P(x_i)x_i^2 - u^2}$$

Since the portfolio is assumed to be diversified, the market value of the portfolio, as the sum of market values of all underlier groups, is normally distributed. Therefore, the standard deviation of the portfolio market value is calculated as follows, where $\delta_i$ is the standard deviation of an underlier group market value and $\rho_{ij}$ is the correlation coefficient between underlier group i and j:

$$\delta = \sqrt{\sum_{i=1}^{n} \sum_{j=1}^{n} \delta_i \delta_j \rho_{ij}}$$

Thus, VaR values are computed as follows based on assumption of normal distribution of the portfolio market value:

VaR 1 day 95%=1.65$\delta$
VaR 1 day 99%=2.33$\delta$
VaR 10 day 95%=1.65$\sqrt{10}\delta$
VaR 10 day 99%=2.33$\sqrt{10}\delta$ As an alternate to displaying a numeric VaR value, the order management system may provide the VaR as a percentage of the portfolio net asset value, which includes cash equivalents in the portfolio. This is provided to assist those users who may prefer seeing the VaR as a percentage of their portfolio to get a better sense of their risk level, rather than a numerical value which may not register the risk levels as clearly.

Another aspect of the order management system of the present invention is a portfolio manager operator that is part of the pre-trade risk manager. The portfolio manager allows a user to arbitrarily create portfolios to be used as a tool to analyze "what-if" scenarios associated with the VaR calculations and reporting. Therefore, a VaR report may contain multiple portfolios, which allow users to compare risk exposures on different portfolios or create hypothetical portfolios to assess the impact of certain trading activities proposed by the user.

Reporting of the VaR values, whether in a numerical or percentage form, is based on a simple spreadsheet-like data grid provided through the graphical interface. Users also have the freedom to arbitrarily define portfolios, choose VaR measure sets, and navigate through the reporting hierarchy.

A VaR report of the order management system has three levels: portfolio, underlier group, and position. The report is in a spreadsheet format, as mentioned, and allows a user to navigate through the reporting hierarchy.

It is understood that for the order management system to run as desired, certain levels of market efficiency must be assumed in the design philosophy. First, it is assumed that the fundamental securities, such as stocks, bonds, foreign exchanges, and futures, exhibit a random walk, with a short-term growth expectation of 0. Thus, prices of these fundamental securities exhibit a log normal (delta-normal) distribution. Second, it is assumed that price movement is serially independent in the short term, (i.e., the time autocorrelation approaches 0). Therefore, the rates of return on these securities are independently identically normally distributed, (i.e., "iind"). Third, it is assumed that the prices of derivatives fully capture market expectations on holding cost (risk free interest rates), underlier volatility during the holding period, and rationality of time premium (no early exercise). Thus, Black-Scholes model is valid in computing theoretical values of derivatives.

Depending on the type of risk assessed by the risk manager, a user may be strictly prohibited from engaging the proposed trade due to violations of preset user defined policies, or the risk manager may offer sufficient warning to the user to take into consideration when executing the order to an exchange.

As further risk reduction tool, the risk manager supports staged orders. A staged order adds security because it ensures that at least one other level of personnel reviews and validates a user's trade before it can be executed. The order is then placed through to the exchange as delegated by a user, with the order management system using a streaming real-time data provider. As is known, a variety of such providers exists, any one of which may be integrated with the order management system of the invention so long as sufficient realtime data streaming is provided.

After execution of the trade into the financial exchange market of choice, the order management system of the present invention further aids a user by providing a post-trade risk analysis operator. The risk analyzer may review a user's past account activity and search the user's portfolio for securities that the analyzer predicts are likely to have an increase or decrease in value. In a preferred embodiment, the risk analyzer receives real-time exchange market data through the streaming real-time data provider. Further, the risk analyzer has access to a memory storage means, preferably in the form of a cache server, and updates exchange market data at a throttle-limited rate of 30 times per second. The limited rate is fast enough to provide meaningful calculations but not so fast as to unduly slow the operation of the system. This allows the risk analyzer to use realtime updates on market status in determining which securities in a user's account portfolio have the potential to increase or decrease in value compared to the current market status.

Although the invention has been described with reference to a particular embodiment having a particular arrangement of functions and features, the description is not intended to exhaust all possible features and uses of the order management system. Indeed, it would be feasible to configure the order management system with additional tools and modify the existing features while still remaining within the scope of the invention as ascertainable to those of skill in the art.

What is claimed is:

1. A system, comprising:
    a communication module configured to communicate with at least one client; and
    a server in communication with the communication module and configured to process a first task identified by the client, the first task associated with an account, the server including a plurality of account-centric pipelines each configured to process the first task, each account-centric pipeline processing the first task only if no other account-centric pipeline is processing a second task associated with the account.

2. The system of claim 1, wherein one or more account-centric pipelines each include a pipeline queue to queue the first task.

3. The system of claim 1, wherein the server further includes a pipeline thread pool configured to assign an executable thread to the first task and to one account-centric pipeline.

4. The system of claim 1, wherein one or more account-centric pipelines each include at least one event processor configured to process a subtask of the first task.

5. The system of claim 1, wherein one or more account-centric pipelines each include a plurality of event processors, one or more event processors each configured to process a subtask of the first task, wherein the plurality of event processors are arranged in an order to sequentially process each subtask in the order.

6. The system of claim 5, wherein the account-centric pipeline is configured to process the first task straight through the account-centric pipeline.

7. The system of claim 6, wherein one or more event processors each are configured to assign a suspend flag or a failed flag to the subtask to move the first task straight through the account-centric pipeline.

8. The system of claim 1, wherein the first task is a compound trade order.

9. The system of claim 8, wherein the compound trade order includes at least one of an order cancel order (OCO) an order send order (OSO), an all-or-none order, and a basket order.

10. A computer-implemented method, comprising the steps of:
    queuing a first task via a computer server to a pipeline queue, the first task associated with an account;
    assigning an executable thread via the computer server to the first task in the pipeline queue and to one account-centric pipeline from a plurality of account-centric pipelines configured to execute the first task; and
    processing the first task through the account-centric pipeline, each account-centric pipeline processing the first task only if no other account-centric pipeline is processing a second task associated with the account.

11. The method of claim 10, wherein one or more account-centric pipelines each include at least one event processor configured to process a subtask of the first task.

12. The method of claim 10, wherein one or more account-centric pipelines each include a plurality of event processors, one or more event processors each configured to process a subtask of the first task, wherein the plurality of event processors are arranged in an order to sequentially process each subtask in the order.

13. The method of claim 12, wherein the first task is processed straight through the account-centric pipeline.

14. The method of claim 13, wherein one or more of the event processors each are configured to assign a suspend flag or a failed flag to the subtask to move the first task straight through the account-centric pipeline.

15. The method of claim 10, wherein the first task is a compound trade order.

16. The method of claim 15, wherein the compound trade order includes at least one of an order cancel order (OCO), an order send order (OSO), an all-or-none order, and a basket order.

17. A computer program product including a computer readable medium having stored thereon computer executable instructions, which when executed on a computer, directs the computer to perform a method comprising the steps of:
    queuing a first task to a pipeline queue, the first task associated with an account;
    assigning an executable thread to the first task in the pipeline queue and to one account-centric pipeline from a plurality of account-centric pipelines configured to execute the first task; and
    processing the first task through the account-centric pipeline, each account-centric pipeline processing the first task only if no other account-centric pipeline is processing a second task associated with the account.

18. The computer program product of claim 17, wherein one or more account-centric pipelines each include at least one event processor configured to process a subtask of the first task.

19. The computer program product of claim 17, wherein one or more account-centric pipelines each include a plurality of event processors, one or more event processors each configured to process a subtask of the first task, wherein the plurality of event processors are arranged in an order to sequentially process each subtask in the order.

20. The computer program product of claim 19, wherein the first task is processed straight through the account-centric pipeline.

21. The computer program product of claim 20, wherein one or more of the event processors each are configured to assign a suspend flag or a failed flag to the subtask to move the first task straight through the account-centric pipeline.

22. The computer program product of claim 17, wherein the first task is a compound trade order.

23. The computer program product of claim 22, wherein the compound trade order includes at least one of an order cancel order (OCO), an order send order (OSO), an all-or-none order, and a basket order.

* * * * *